April 20, 1937. C. E. BUDD 2,077,916
BRAKE
Original Filed Sept. 28, 1933

INVENTOR.
CLARENCE E. BUDD
BY
ATTORNEY

Patented Apr. 20, 1937

2,077,916

UNITED STATES PATENT OFFICE 2,077,916

BRAKE

Clarence E. Budd, South Bend, Ind., assignor to Bendix Aviation Corporation, South Bend, Ind., a corporation of Delaware Original application September 28, 1933, Serial No. 691,361. Divided and this application February 5, 1936, Serial No. 62,399

4 Claims. (Cl. 188—79.5)

This invention relates to brakes, and is illustrated as embodied in an internal expanding brake for an automobile wheel.

An object of the invention is to provide an inexpensive and rigid structure adapted to serve as an adjustable brake anchorage. In one desirable arrangement two parts, secured one over the other to the brake backing plate, are formed to provide sockets for thrust members engaging the ends of the brake shoes, and to support an adjustment device acting on the ends of the thrust members.

Preferably the adjustment device is operable from outside the backing plate. The illustrated form includes a stem threaded adjustably through one of the parts secured to the backing plate, and carrying a cone or the like arranged to wedge apart the ends of the thrust members.

Various features of novelty relate to the form and arrangement of the above-described two anchorage parts, and to other novel combinations and desirable particular constructions which will be apparent from the following description of the illustrative embodiment shown in the accompanying drawing, in which.

Figure 1:
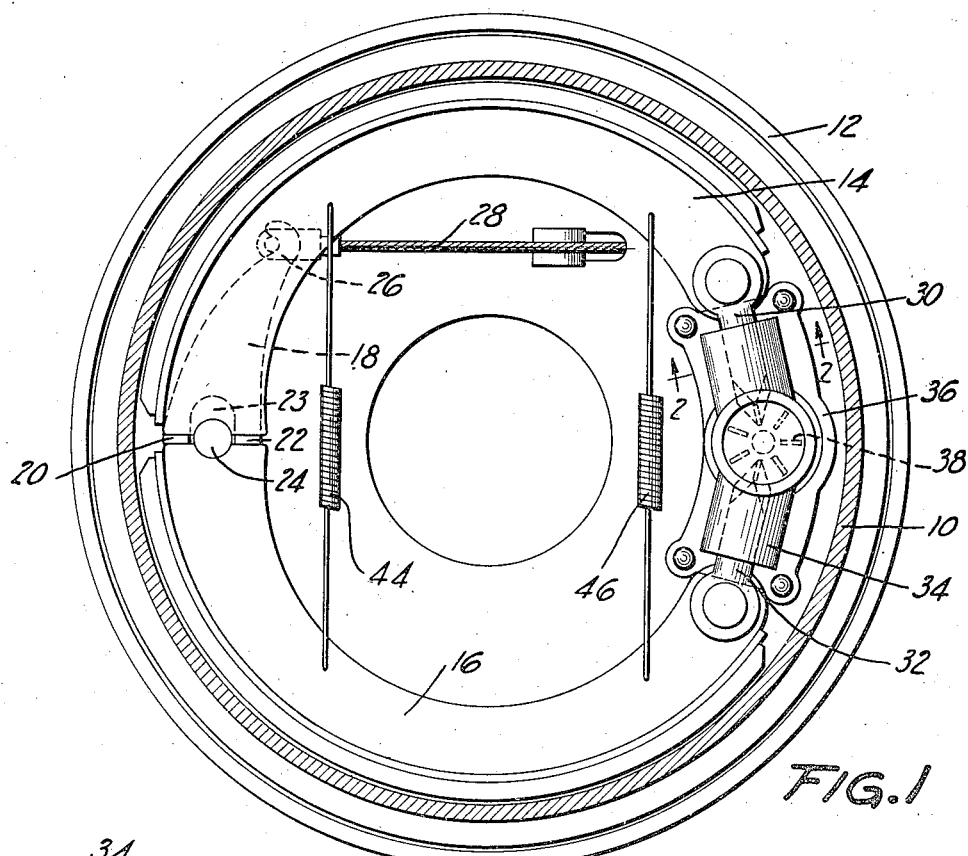
Figure 1 is a vertical section through the brake, just inside the head of the brake drum, and showing the brake shoes in side elevation.
Figure 3:
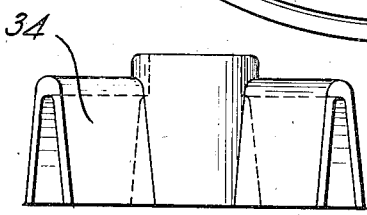
Figure 3 is a side elevation of one of said parts.
Figure 2:
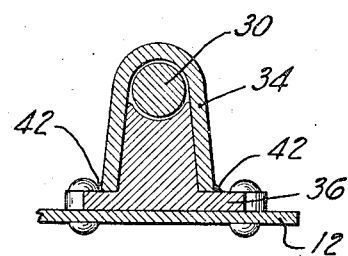
Figure 2 is a partial section, on the line 2—2, showing the two superposed anchorage parts secured to the backing plate.
Figure 4:
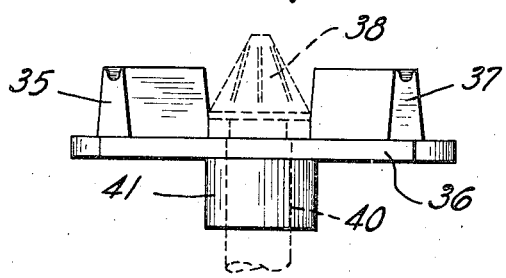
Figure 4 is a side elevation of the other of said parts.

The illustrated brake includes a drum 10, a backing plate 12 arranged at the open side of the drum, and friction means (illustrated as comprising two shoes 14 and 16) within the drum.

The shoes 14 and 16 are adapted to be spread apart, to apply the brake, by means such as a cam lever 18 having lugs 20 and 22 interposed between the ends of the shoes, and shown with a cut-out portion 23 aligned with a positioning pin or stop 24 engaged by the ends of the shoes when the brake is released.

The lever 18 has at its upper end a hook 26 connected to a tension element such as a cable 28 forming part of a Bowden-type control by which the brake is operated.

The opposite ends of the shoes 14 and 16 are pivotally connected to thrust members such as pointed strut links 30 and 32 respectively. These links are guided by a novel housing which, according to an important feature of the present invention, comprises two separately-formed cooperating parts such as a stamping 34 and a forging 36. The pointed ends of the links bear upon a conical wedge 38.

The forging 36 is shown formed with a pair of grooved lugs 35 and 37, the grooves coacting with the roof of the stamping 34 to form a pair of cylindrical guideways or sockets for the strut links 30 and 32. The conical wedge 38 has a stem by which it is operated, and which is threaded through a bore 40 in a boss 41 on the forging 36, in order to adjust the positions of the shoes.

The forging 36 is secured, as for example by rivets, to the backing plate 12, and the stamping 34, in the form illustrated, is adapted to be secured to the forging by means such as welds 42.

Thus it will be seen that in the braking operation the shoe which does most of the braking anchors through its strut link on the wedge 38 and thence through the forging 36 on the backing plate 12.

Return springs 44 and 46 are shown arranged to return the shoes to normal released positions when tension on the element 28 is relieved.

When the operator desires to apply the brake, he pulls on the tension element 28, rocking the lever 18, and spreading the shoes 14 and 16 against the drum. The lever 18 may float vertically with the movements of the shoes 14 and 16. The shoes anchor, as described above, through the adjustable wedge 38. When necessary to adjust the shoes for wear, the wedge 38 is screwed in to spread apart the anchored ends of the shoes.

While one illustrative brake has been described in detail, it is not my intention to limit the scope of my invention to that brake, or by that description, or otherwise than by the terms of the appended claims. The present application is a division of my application No. 691,361, filed September 28, 1933.

I claim:

1. A brake comprising a drum, a backing plate, a pair of shoes therein, a strut link pivoted to an end of each shoe, and a housing for the strut links comprising a forging seated against the backing plate and a stamping enveloping the forging except for the side engaging the backing plate, the forging and stamping being formed to provide between them sockets for the links.

2. A brake comprising a drum, a backing plate, a pair of shoes therein, a strut link pivoted to an end of each shoe, and a housing for the strut links comprising a forging and a stamping secured to the backing plate, said forging being riveted to the backing plate and said stamping being welded to the forging.

3. A brake comprising a drum, a backing plate, a pair of shoes therein, a strut link pivoted to an end of each shoe, and a housing for the strut links comprising a forging and a stamping secured to the backing plate, said forging being formed with a pair of grooved lugs which coact with the stamping to form a pair of cylindrical guideways for the strut links.

4. A brake comprising a drum, a backing plate, a pair of shoes therein, a strut link pivoted to an end of each shoe, and a housing for the strut links comprising a forging and a stamping secured to the backing plate, said forging being formed with grooves and said stamping with parts overlying the grooves, said grooves and parts forming a pair of guideways for the strut links, and said brake being provided with an adjusting wedge extending perpendicularly to the guideways, and said forging and stamping being provided with aligned openings for the reception of said adjusting wedge.

CLARENCE E. BUDD.